United States Patent
Schroeder

(10) Patent No.: US 6,486,659 B1
(45) Date of Patent: Nov. 26, 2002

(54) MAGNETORESISTOR SENSOR DIE WITH AN ARRAY OF MRS

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/861,965

(22) Filed: May 21, 2001

(51) Int. Cl.⁷ ................................................ G01B 7/30
(52) U.S. Cl. .......................... 324/207.21; 324/207.25; 324/207.12
(58) Field of Search .................. 324/207.12, 207.2, 324/207.21, 207.25, 207.22, 252; 338/32 R, 32 H

(56) References Cited

U.S. PATENT DOCUMENTS

| | | | |
|---|---|---|---|
| 4,835,467 A | 5/1989 | Gokhale | 324/166 |
| 5,038,130 A * | 8/1991 | Eck et al. | 324/207.21 |
| 5,153,557 A | 10/1992 | Partin et al. | 338/32 R |
| 5,184,106 A | 2/1993 | Partin et al. | 338/32 R |
| 5,404,102 A | 4/1995 | Gokhale et al. | 324/252 |
| 5,491,461 A | 2/1996 | Partin et al. | 338/32 R |
| 5,570,016 A | 10/1996 | Schroeder et al. | 324/207.25 |
| 5,731,702 A | 3/1998 | Schroeder et al. | 324/207.21 |
| 5,754,042 A | 5/1998 | Schroeder et al. | 324/207.25 |
| 6,175,296 B1 * | 1/2001 | Tokunaga et al. | 324/207.21 |
| 6,191,577 B1 * | 2/2001 | Sasaki et al. | 324/207.21 |
| 6,326,782 B1 * | 12/2001 | Schroeder | 324/207.21 |

* cited by examiner

*Primary Examiner*—Jay Patidar
(74) *Attorney, Agent, or Firm*—Margaret A. Dobrowitsky

(57) ABSTRACT

A single die MR array composed of a plurality of MR elements, wherein each MR element is composed of a number of serially connected MR segments. The MR elements are arranged and configured so as to produce a variety of MR array geometries. In one form, an MR array is formed to provide angular sensing schemes wherein angular measurement redundancy is incorporated therein. In a second form, an MR array is formed to provide angular sensing schemes wherein angular measurement redundancy and reference redundancy are incorporated therein.

12 Claims, 9 Drawing Sheets

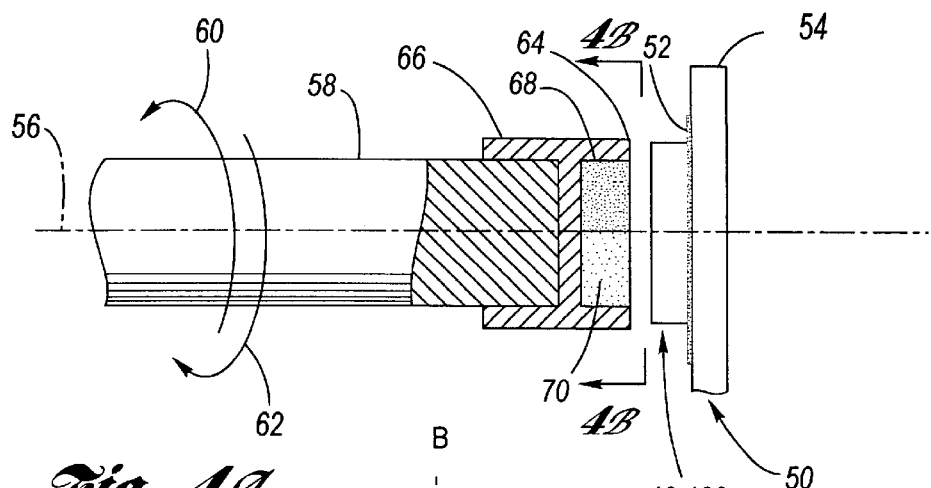
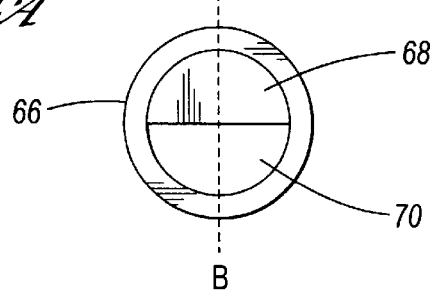
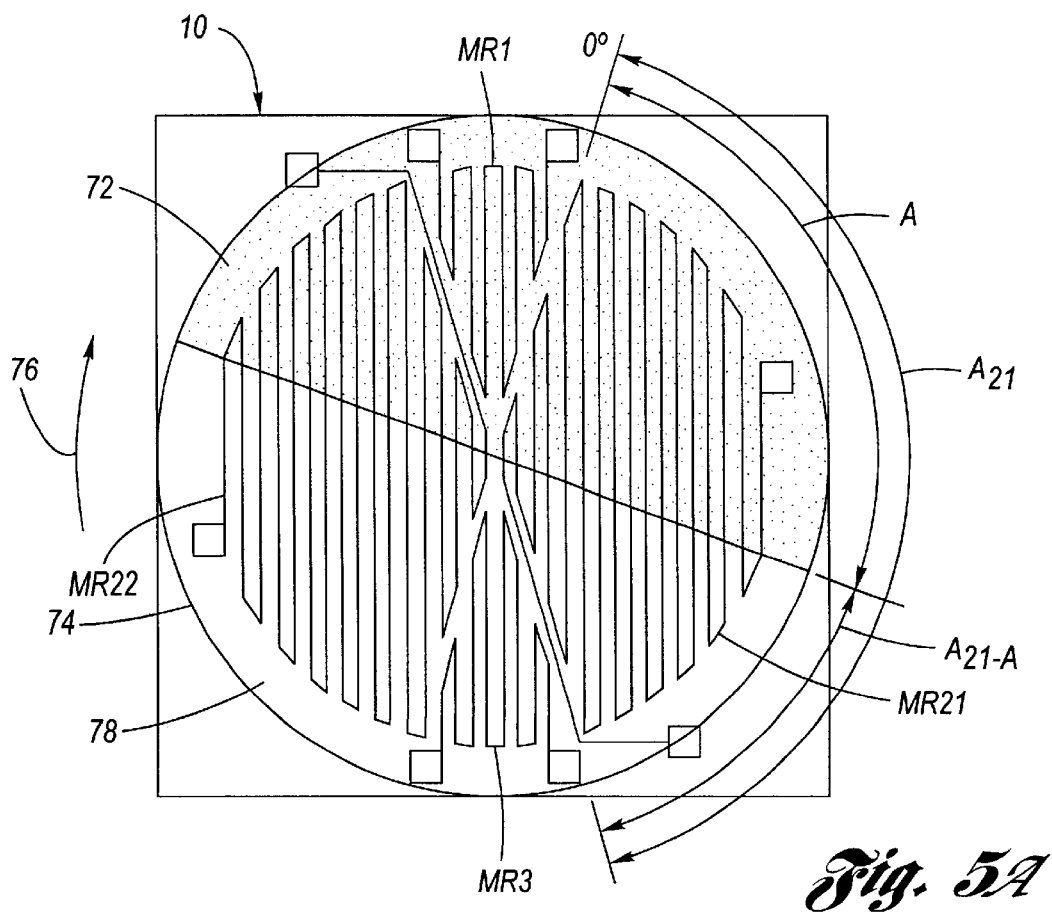

MAGNETORESISTOR SENSOR DIE WITH AN ARRAY OF MRS

TECHNICAL FIELD

The present invention relates to magnetoresistor arrays used for magnetic position sensors.

BACKGROUND OF THE INVENTION

The use of magnetoresistors (MRs) and Hall devices as position sensors is well known in the art. For example, a magnetically biased differential MR sensor may be used to sense angular position of a rotating toothed wheel, as for example exemplified by U.S. Pat. Nos. 4,835,467, 5,731,702, and 5,754,042.

In such applications, the magnetoresistor (MR) is biased with a magnetic field and electrically excited, typically, with a constant current source or a constant voltage source. A magnetic (i.e., ferromagnetic) object moving relative and in close proximity to the MR, such as a toothed wheel, produces a varying magnetic flux density through the MR, which, in turn, varies the resistance of the MR. The MR will have a higher magnetic flux density and a higher resistance when a tooth of the moving target wheel is adjacent to the MR than when a slot of the moving target wheel is adjacent to the MR.

Increasingly more sophisticated spark timing and emission controls introduced the need for crankshaft sensors capable of providing precise position information during cranking. Various combinations of magnetoresistors and single and dual track toothed or slotted wheels (also known as encoder heels and target wheels) have been used to obtain this information (see for example U.S. Pat. Nos. 5,570,016, 5,731,702, and 5,754,042).

The shortcoming of MR devices is their temperature sensitivity. They have a negative temperature coefficient of resistance and their resistance can drop as much as 50% when heated to 180 degrees Celsius. Generally, this led to the use of MR devices in matched pairs for temperature compensation. Additionally, it is preferable to drive MR devices with current sources since, with the same available power supply, the output signal is nearly doubled in comparison with a constant voltage source.

To compensate for the MR resistance drop at higher temperatures, and thus, the magnitude decrease of the output signal resulting in decreased sensitivity of the MR device, it is also desirable to make the current of the current source automatically increase with the MR temperature increase. This is shown in U.S. Pat. No. 5,404,102 in which an active feedback circuit automatically adjusts the current of the current source in response to temperature variations of the MR device. It is also known that air gap variations between the MR device and ferromagnetic materials or objects will affect the resistance of MR devices with larger air gaps producing less resistance and decreased output signals.

Single element magnetic field sensors composed of, for example, an indium antimonide or indium arsenide epitaxial film strip supported on, for example, a monocrystalline elemental semiconductor substrate, are also known. The indium antimonide or indium arsenide film is, for example, either directly on the elemental semiconductor substrate or on an intermediate film that has a higher resistivity than that of silicon. A conductive contact is located at either end of the epitaxial film, and a plurality of metallic (gold) shorting bars are on, and regularly spaced along, the epitaxial film. Examples thereof are exemplified by U.S. Pat. Nos. 5,153,557, 5,184,106 and 5,491,461.

Most noncontacting magnetic angle position sensors use a Hall sensor and a rotating magnetic field. Since the Hall sensor output signal is proportional to the normal component of the magnetic field, its output is a sinusoidal function of the angle of rotation. Only within a relatively small angular range is the output proportional to the angle of rotation. Depending on the required accuracy, this range may be as small as ±30 degrees with a ±1.3% full scale error and, practically, never greater than ±50 degrees with almost a ±10% full scale error. Another approach relies on varying the air gap between a Hall sensor and a magnetic target. This allows a greater angular range. However, it is an inherently error prone method due to the high degree of non linearity in the relation between the magnetic field strength and the air gap.

Compound semiconductor MRs, such as those manufactured from InSb, InAs, etc., are simply two-terminal resistors with a high magnetic sensitivity and thus, are very suitable for the construction of single die MR array geometries suitable for use as large range angular position sensors (in most cases one terminal of all the MR elements can be common).

Ultimately, such MR arrays could be integrated on the same die with appropriate processing circuitry. For example, if the MR array was fabricated on a Si substrate then the processing circuitry would be also Si based. For higher operating temperatures, silicon-on-insulator (SOI) could be used. A potentially lower cost alternative to the SOI approach would be to take advantage of the fact that MRs are currently fabricated on GaAs, a high temperature semiconductor, and thus, to fabricate the integrated processing circuitry from GaAs (or related InP) using HBT (Heterojunction Bipolar Transistor) or HEMT (High Electron Mobility Transistor) structures. This technology is now easily available and inexpensive through the explosive growth of the cellular phone industry.

Accordingly, what remains needed is a compact and inexpensive die having at least one array of magnetic sensing elements and configured so as to produce a variety of array geometries suitable for specialized angular sensing schemes capable of self compensation over wide ranges of temperature and air gaps, wherein an array is defined as having three or more MR elements.

SUMMARY OF THE INVENTION

The present invention is a compact and inexpensive single die having at least one MR array composed of a plurality of MR elements, wherein each MR element is composed of a number of serially connected MR segments. The MR elements are arranged and configured so as to produce a variety of MR array geometries suitable for specialized angular sensing schemes.

The present invention is a noncontacting large angular range (approaching 180 degrees) angular magnetoresistor position sensor array incorporated on a die capable of self compensation over wide temperature ranges and air gaps.

According to a first aspect of the present invention, an MR array is formed of a plurality of MR elements, wherein each MR element is composed of a plurality of uniformly arranged, serially connected MR segments. The arrangement is such as to provide an MR array suitable for angular sensing schemes wherein angular measurement redundancy is incorporated therein.

According to a second aspect of the present invention, an MR array is formed of a plurality of MR elements, wherein each MR element is composed of a plurality of uniformly arranged, serially connected MR segments. The arrangement is such as to provide an MR array suitable for angular sensing schemes wherein angular measurement redundancy and reference redundancy are incorporated therein.

According to a preferred method of fabrication, an indium antimonide epitaxial film is formed, then masked and etched to thereby provide epitaxial mesas characterizing the MR elements. Shorting bars, preferably of gold, are thereupon deposited, wherein the epitaxial mesa not covered by the shorting bars provides the MR segments. The techniques for fabricating epitaxial mesas with shorting bars are elaborated in U.S. Pat. No 5,153,557, issued Oct. 6, 1992, U.S. Pat. No 5,184,106, issued Feb. 2, 1993 and U.S. Pat. No. 5,491,461, issued Feb. 13, 1996, each of which being hereby incorporated herein by reference.

Accordingly, it is an object of the present invention to provide an MR die comprising at least one MR array according to the first and second aspects of the present invention which is capable of detecting angular movement of a ferromagnetic or magnetic target in relation to the MR array.

This and additional objects, features and advantages of the present invention will become clearer from the following specification of a preferred embodiment.

BRIEF DESCRIPTION OF THE DRAWINGS

FIG. 4A depicts a second example of the preferred environment of use of the present invention.

FIG. 4B is a view seen along line 4B—4B of FIG. 4A.

FIG. 5A is a schematic representation of a single die MR array according to the first aspect of the present invention depicting an angular displacement of the first or second example of the preferred environment of use of the present invention according to FIG. 3A or FIG. 4A.

DETAILED DESCRIPTION OF THE PREFERRED EMBODIMENT

Figure 1A:
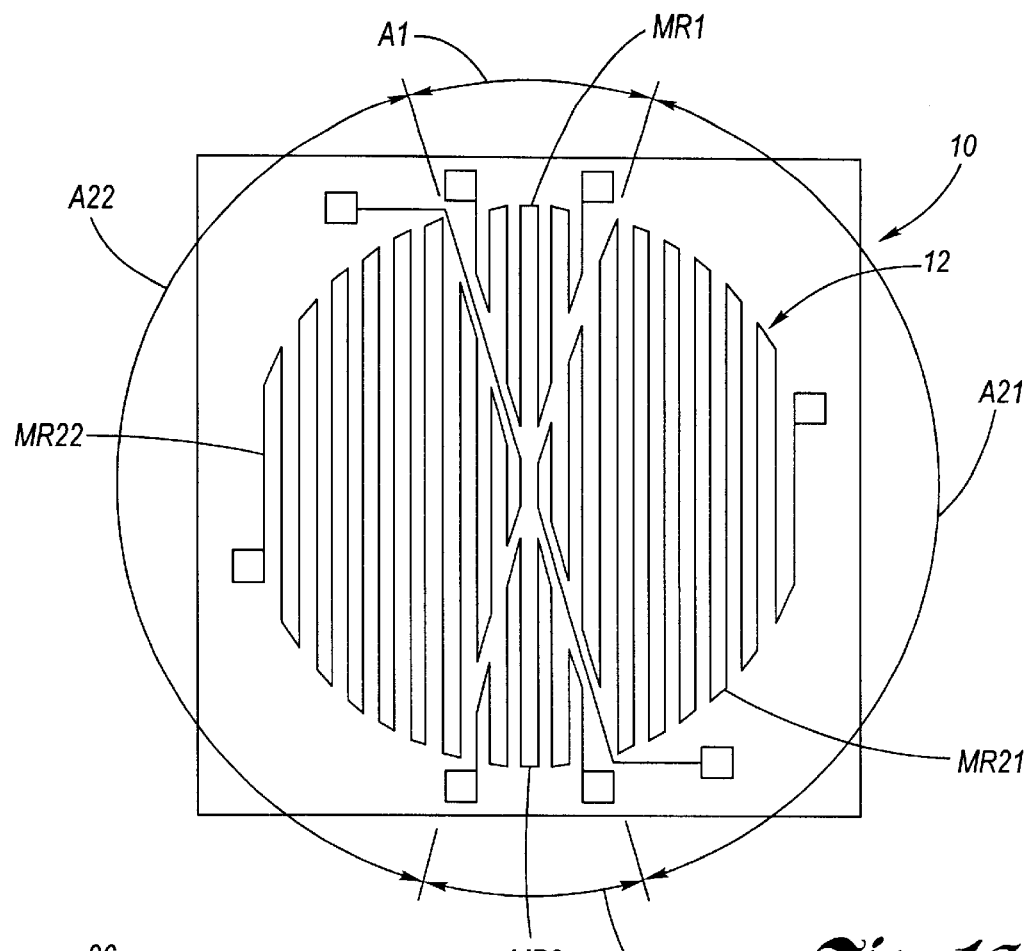
FIG. 1A is a schematic representation of a single die MR array according to a first aspect of the present invention.

FIG. 1A is a schematic representation of an MR die 10 on which an MR array 12 according to a first aspect of the present invention is depicted. The MR array 12 is comprised of four magnetoresistor elements, MR1, MR21, MR22, and MR3 wherein MR1 spans the angle A1, MR21 spans the angle A21, MR22 spans the angle A22, and MR3 spans the angle A3. The shape of the MR array 12 is, preferably, circular, as depicted in FIG. 1A, but may be otherwise. MR21 and MR22 are the angle measuring elements whereas MR1 and MR3 are reference elements. MR22 is intended to provide a redundant angle measurement as required by many throttle position sensor specifications. If redundancy is not required, MR22 may be absent. Generally, and as shown in FIG. 1A, angles A1 and A3 are equal and angles A21 and A22 are equal, but this is not a fundamental requirement.

Figure 1B:
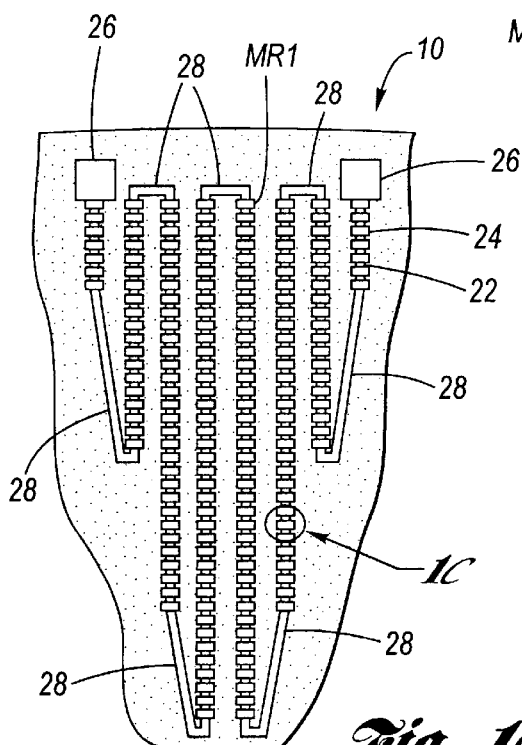
FIG. 1B is a detailed depiction of an MR element of the single die MR array of FIG. 1A.
Figure 1C:
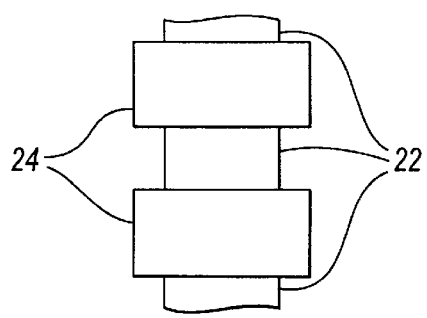
FIG. 1C is a detail view of a portion of an MR element of FIG. 1A, seen by way of example at circle 1C of FIG. 1B.

FIGS. 1B and 1C show a portion of the MR die 10, in particular MR element MR1 of the MR array 12. Structurally, MR element MR1 consists of a plurality of MR segments 22 demarcated by uniform shorting bars 24 which are preferably gold. The MR segments 22 are each uniformly matched to the others (that is, the MR segments are identical). By way of preferred example, each MR segment 22 is composed of indium antimonide (InSb) epitaxial film mesas. Each epitaxial film mesa is provided, by way of preferred example, by forming an indium antimonide epitaxial film, then masking and etching it. The shorting bars 24, which demarcate the MR segments 22, are composed of gold bars deposited upon the MR segments. Bonding pads (contacts or terminals) 26, preferably also of gold, are provided at the ends of each MR element. Also, connecting strips 28 are also preferably of gold. The other MR elements of the MR array 12 are similarly constructed of MR segments demarcated by shorting bars, bonding pads and connecting strips.

Figure 2:
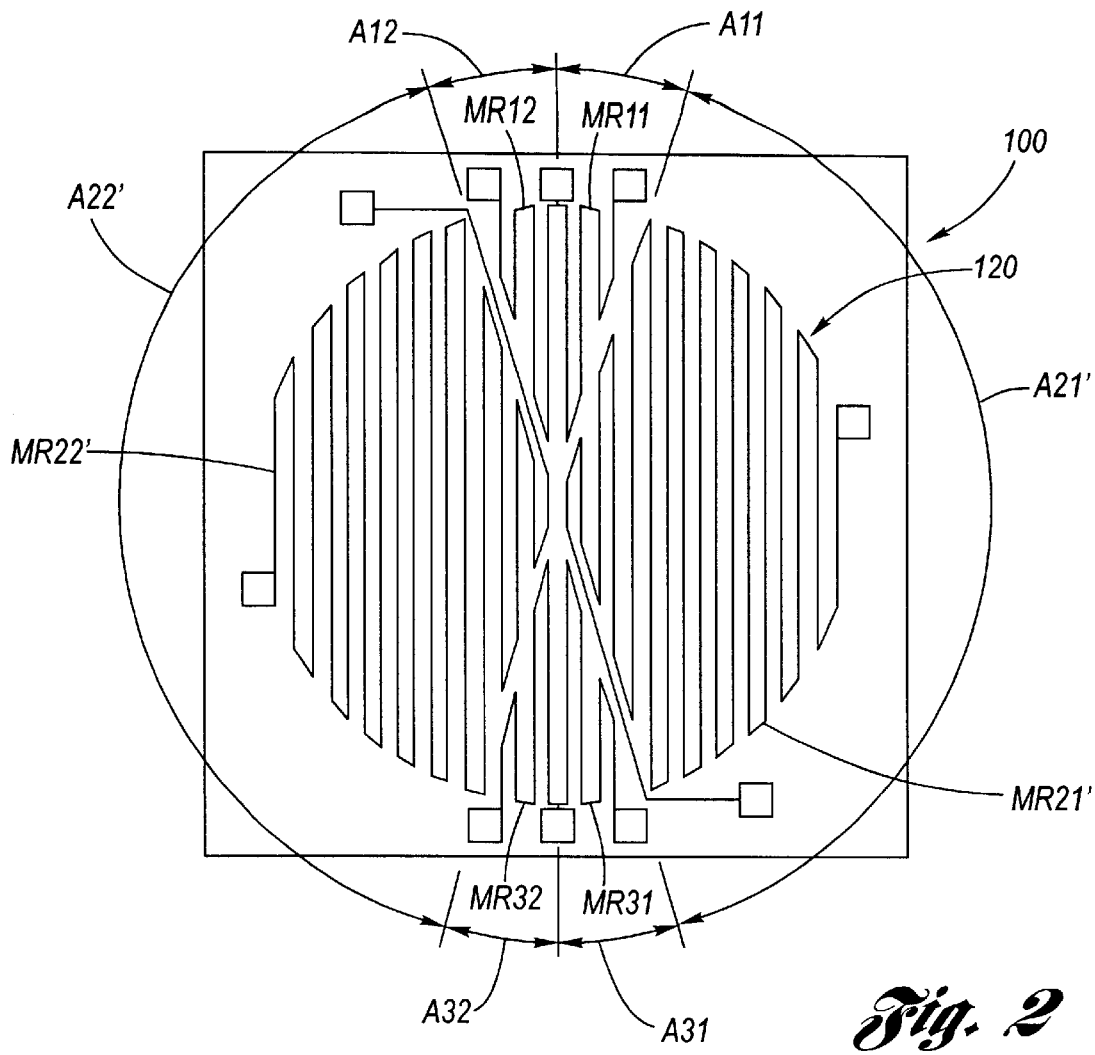
FIG. 2 is a schematic representation of a single die MR array according to the second aspect of the present invention.

FIG. 2 is a schematic representation of an MR die 100 on which an MR array 120 according to a second aspect of the present invention is depicted. The MR array 120 is comprised of six magnetoresistor elements, MR11, MR12, MR21', MR22', MR31, and MR32 wherein MR11 spans the angle A11, MR12 spans the angle A12, MR21' spans the angle A21', MR22' spans the angle A22', MR31 spans the angle A31, and MR32 spans the angle A32. The shape of the MR array 120 is, preferably, circular, as depicted in FIG. 2, but may be otherwise. MR21' and MR22' are the angle measuring elements whereas MR11, MR12, MR31, and MR32 are reference elements. MR22' is intended to provide a redundant angle measurement as required by many throttle position sensor specifications and MR12 and MR32 provide redundant reference elements. Generally, and as shown in FIG. 2, angles A11, A12, A31, and A32 are equal and angles A21' and A22' are equal, but this is not a fundamental requirement.

The MR array 120 is generally fabricated according to the method previously described for the MR array 12' of FIG. 1B, including the respective conductive contact at each opposing end of each MR element.

Figure 3A:
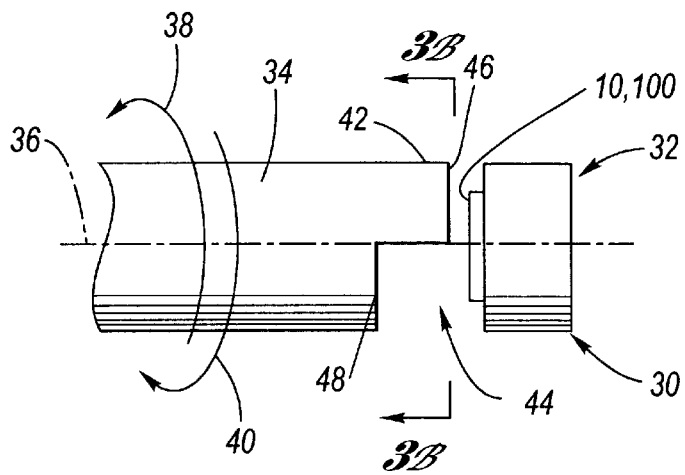
FIG. 3A depicts a first example of the preferred environment of use of the present invention.
Figure 3B:
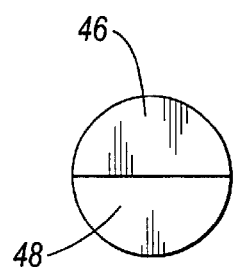
FIG. 3B is a view seen along line 3B—3B of FIG. 3A.

FIGS. 3A and 3B depict a first example of the preferred environment of use of the present invention. The single MR sensor 30, preferably stationary, employs an MR die 10 of FIG. 1A or an MR die 100 of FIG. 2 which is biased by a permanent magnet 32, wherein the MR sensor is coaxially aligned with the axis 36 of a magnetic (i.e. ferromagnetic) shaft 34 such that the surface of the MR die lies in a plane perpendicular to the axis of the magnetic shaft. The magnetic shaft 34 can rotate clockwise 38 or counterclockwise 40 about the axis 36 of the shaft. The end 42 of the shaft 34 adjacent the sensor 30 has a notch 44 such that a tooth 46 and slot 48 are formed, thereby creating a rotating tooth and slot such that the die 10 or 100 experiences a maximum magnetic flux density on those portions thereof adjacent to the tooth and a minimum magnetic flux density on those portions thereof adjacent to the slot.

FIGS. 4A and 4B depict a second example of the preferred environment of use of the present invention. The single MR sensor 50, preferably stationary, is comprised of an MR die 10 of FIG. 1A or an MR die 100 of FIG. 2, a magnetic (i.e. ferromagnetic) layer 52, and a circuit board 54. The circuit board 54 may be located elsewhere, if desired. The layer 52, preferably less than one millimeter thick, increases the sensitivity of the sensor to magnetic fields and is optional. The sensor 50 is coaxially aligned with the axis 56 of a nonmagnetic shaft 58 such that the surface of the MR die 10 or 100 lies in a plane perpendicular to the axis of the shaft. The shaft 58 can rotate clockwise 60 or counterclockwise 62 about the axis 56 of the shaft. On the end 64 of the shaft 58 adjacent the sensor 50 is attached a magnet assembly 66 which rotates with the shaft and is coaxially aligned with the shaft 58. The magnet assembly 66 has a permanent magnet 68, preferably in the form of a semicircular disk, such that one half of the area of the end 64 of the shaft 58 is covered, thereby forming a tooth whereas the other half of the area of the end of the shaft is covered with a nonmagnetic material 70 thereby forming a slot by which a rotating tooth and slot is created such that the die 10 or 100 experiences a maximum magnetic flux density on those portions thereof adjacent to the tooth and a minimum magnetic flux density on those portions thereof adjacent to the slot.

FIG. 5A is a schematic representation of a single die MR array 10 according to the first aspect of the present invention of the first or second example of the preferred environment of use of the present invention according to FIG. 3A or 4A. The shaded portion 72 of the overlay 74 represents the tooth 46 or 68, respectively, whereas the unshaded portion 78 represents the slot 48 or 70. FIG. 5A depicts, in this case, a clockwise rotation 76 of the tooth 46 or 68 through an angular displacement A from an initial position of zero degrees wherein at the initial position of zero degrees, MR21 is totally under the slot 48 or 70 and MR22 is totally under the tooth. The angular displacement A is limited during clockwise rotation 76 such that the tooth 46 or 68 always covers MR1 and the slot 48 or 70 always covers MR3 ensuring that MR1 always experiences a maximum magnetic flux density and MR3 always experiences a minimum magnetic flux density whereas the coverage of MR21 or MR22 varies from being totally under the slot to being totally under the tooth by which the resistance of MR21, $R_{21}$, and MR22, $R_{22}$, varies, preferably linearly, from a minimum, $R_{MIN}$, to a maximum, $R_{MAX}$. MR1 is designed such that its resistance, $R_1$, is a fraction p of $R_{MAX}$ when exposed to the maximum magnetic flux density and MR3 is designed such that its resistance, $R_3$, is a fraction q of $R_{MIN}$ when exposed to the minimum magnetic flux density where p and q have, preferably, values between greater than zero and one. Hence, $R_1/p=R_{MAX}$ and $R_3/q=R_{MIN}$. Values for p and q greater than one are permissible but there does not appear to be any benefit in doing so.

At an angular displacement A, $$R_{21}=(A/A21)*R_1/p+(1-(A/A21))*R_3/q \quad (1)$$

and $$R_{22}=(1-(A/A22)*R_1/p+(A/A22))*R_3/q \quad (2)$$

from which, $$A=A21(R_{21}-R_3/q)/(R_1/p-R_3/q) \quad (3)$$

and $$A=A22(R_1/p-R22)/(R_1/p-R_3/q) \quad (4)$$

thereby enabling the angle A to be determined given p, q, $R_1$, $R_{21}$, $R_3$, and A21 or, redundantly, given p, q, $R_1$, $R_{22}$, $R_3$, and A22. Preferably, p, q, $R_1$, $R_3$, A21, and A22 are known from the die characteristics and $R_{21}$ and $R_{22}$ are variables to be determined from measurements.

Figure 5B:
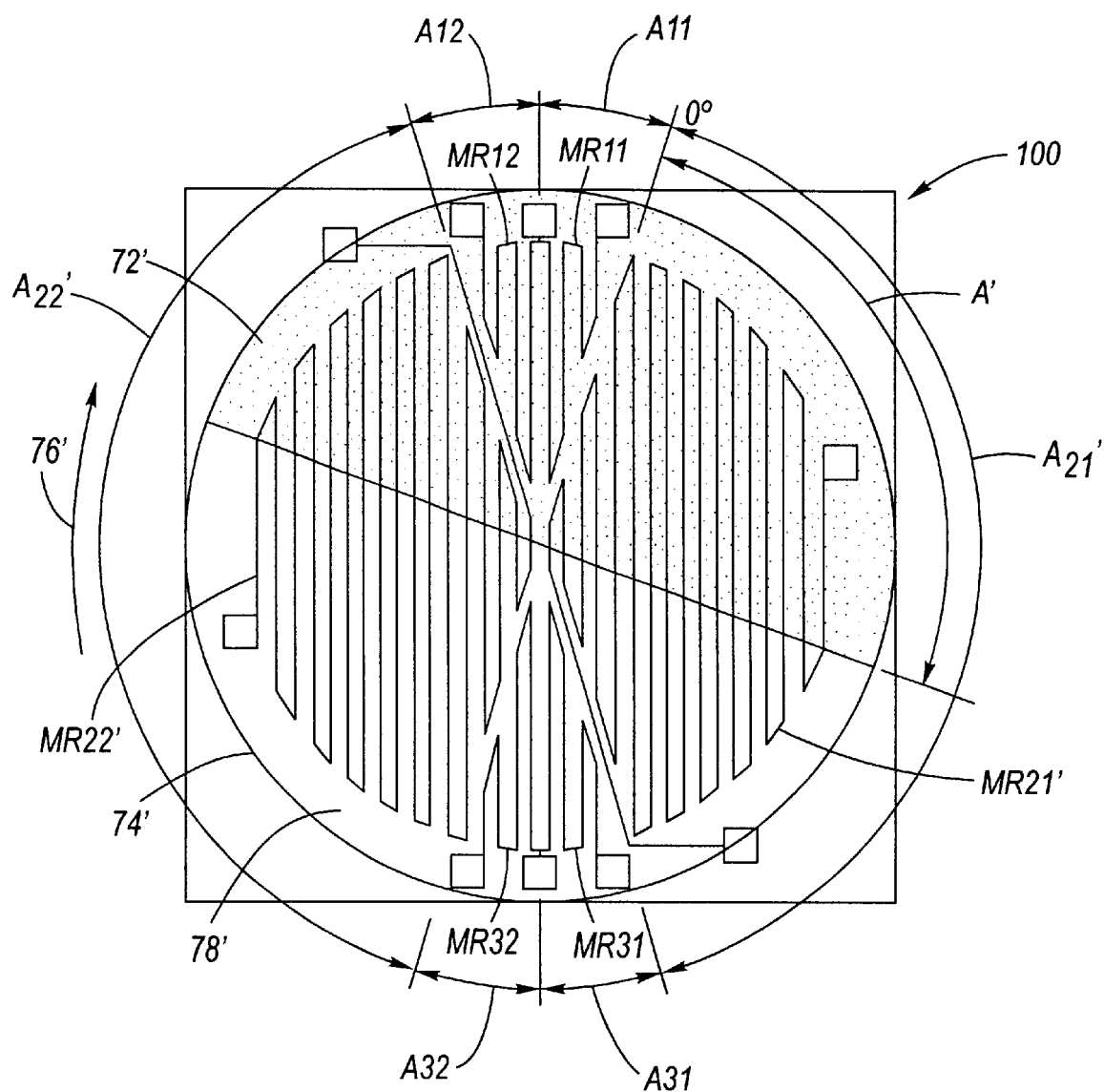
FIG. 5B is a schematic representation of a single die MR array according to the second aspect of the present invention depicting an angular displacement of the first or second example of the preferred environment of use of the present invention according to FIG. 3A or FIG. 4A.

FIG. 5B is a schematic representation of a single die MR array 100 according to the second aspect of the present invention depicting an angular displacement of the first or second example of the preferred environment of use of the present invention of FIG. 3A or FIG. 4A. The shaded portion 72' of the overlay 74' represents the tooth 46 or 68 of FIG. 3 or FIG. 4, respectively, whereas the unshaded portion 78' represents the slot 48 or 70. FIG. 5B depicts, in this case, a clockwise rotation 76' of the tooth 46 or 68 through an angular displacement A' from an initial position of zero degrees wherein at the initial position of zero degrees, MR21' is totally under the slot 48 or 70 and MR22' is totally under the tooth. The angular displacement A' is limited during clockwise rotation 76' such that the tooth 46 or 68 always covers MR11 and MR12 and the slot 48 or 70 always covers MR31 and MR32 ensuring that MR11 and MR12 always experience a maximum magnetic flux density and MR31 and MR32 always experience a minimum magnetic flux density whereas the coverage of MR21' or MR22' varies from being totally under the slot to being totally under the tooth by which the resistance of MR21', R'$_{21}$, and MR22', R'$_{22}$, varies, preferably linearly, from a minimum, R'$_{MIN}$, to a maximum, R'$_{MAX}$. MR11 and MR12 are designed such that their resistances, $R_{11}$ and $R_{12}$, are a fraction p' of R'$_{MAX}$ when exposed to the maximum magnetic flux density and MR31 and MR32 are designed such that their resistances, $R_{31}$ and $R_{32}$, are a fraction q' of R'$_{MIN}$ when exposed to the minimum magnetic flux density where p' and q' have, preferably, values between greater than zero and one. Hence, $R_{11}/p'=R_{12}/p'=R'_{MAX}$ and $R_{31}/q'=R_{32}/q'=R'_{MIN}$. Values for p' and q' greater than one are permissible but there does not appear to be any benefit in doing so.

At an angular displacement A', $$R'_{21}=(A'/A21')*R_{12}/p'+(1-(A'/A21'))*R_{32}/q' \quad (5)$$

$$R'_{21}=(A'/A21')*R_{11}/p'+(1-(A'/A21'))*R_{31}/q' \quad (6)$$

$$R'_{22}=(1-(A'/A22')*R_{12}/p'+(A'/A22'))*R_{32}/q' \quad (7)$$

and $$R'_{22}=(1-(A'/A22')*R_{11}/p'+(A'/A22'))*R_{31}/q' \quad (8)$$

from which, $$A'=A21'(R'_{21}-R_{32}/q')/(R_{12}/p'-R_{32}/q') \quad (9)$$

$$A'=A21'(R'_{21}-R_{31}/q')/(R_{11}/p'-R_{31}/q') \quad (10)$$

$$A'=A22'(R_{12}/p'-R'_{22})/(R_{12}/p'-R_{32}/q') \quad (11)$$

and $$A' = A22'(R_{11}/p' - R'_{22})/(R_{11}/p' - R_{31}/q') \tag{12}$$

thereby enabling the angle A' to be determined with full redundancy given p', q', $R_{11}$, $R_{12}$, $R'_{21}$, $R'_{22}$, $R_{31}$, $R_{32}$, A21' and A22'. Preferably, p', q', $R_{11}$, $R_{12}$, $R_{31}$, $R_{32}$, A21', and A22' are known from the die characteristics and $R'_{21}$ and $R'_{22}$ are variables to be determined from measurements.

Figure 6:
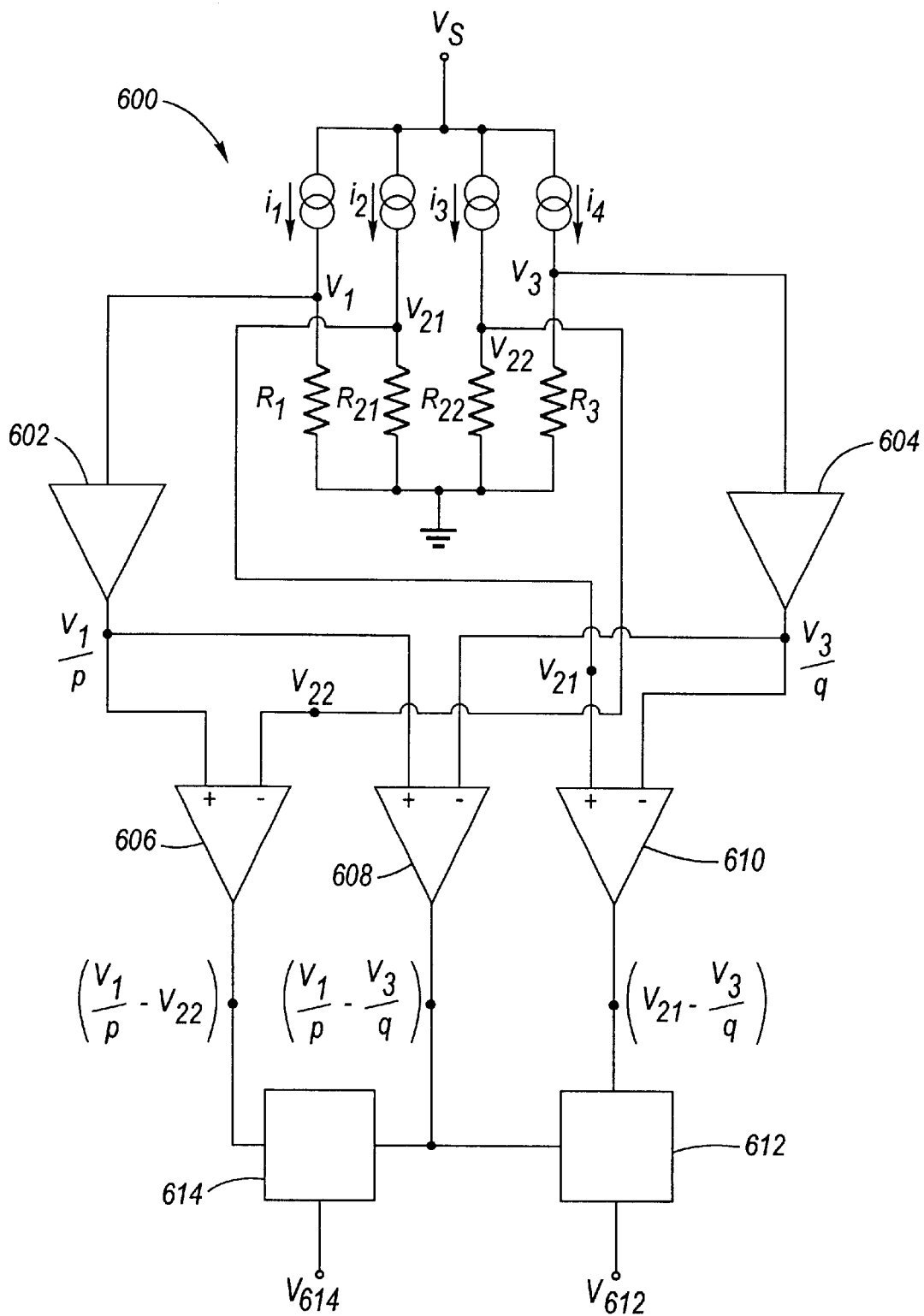
FIG. 6 shows a first example of an analog circuit implementing the first aspect of the present invention.

FIG. 6 shows a first example of an analog circuit 600 implementing the first aspect of the present invention. $V_s$ is the power supply voltage and $i_1$, $i_2$, $i_3$ and $i_4$ are matched constant current sources such that $i_1=i_2=i_3=i_4$. $V_1$, $V_{21}$, $V_{22}$, and $V_3$ are given by:

$$V_1 = i_1 * R_1 \tag{13}$$

$$V_{21} = i_2 * R_{21} \tag{14}$$

$$V_{22} = i_3 * R_{22} \tag{15}$$

and $$V_3 = i_4 * R_3 \tag{16}.$$

Amplifier 602 (i.e. an OP-AMP) has a preset gain of (1/p) whereas amplifier 604 (i.e. an OP-AMP) has a preset gain of (1/q). The output of differential amplifiers 606, 608, and 610 are, respectively, $(V_1/p - V_{22})$, $(V_1/p - V_3/q)$, and $(V_{21} - V_3/q)$. Single quadrant analog divider 612 has a preset gain of A21 whereas single quadrant analog divider 614 has a preset gain of A22 whereby, since the current sources are matched, $$V_{612} = A21(V_{21} - V_3/q)/(V_1/p - V_3/q) = A21(R_{21} - R_3/q)/(R_1/p - R_3/q) = A \tag{17}$$

and $$V_{614} = A22(V_1/p - V22)/(V_1/p - V_3/q) = A22(R_1/p - R_{22})/(R_1/p - R_3/q) = A \tag{18}$$

thereby determining the angle of rotation A. Although not explicitly shown, it is understood that all components have appropriate power supply connections as needed and required, including ground.

Figure 7:
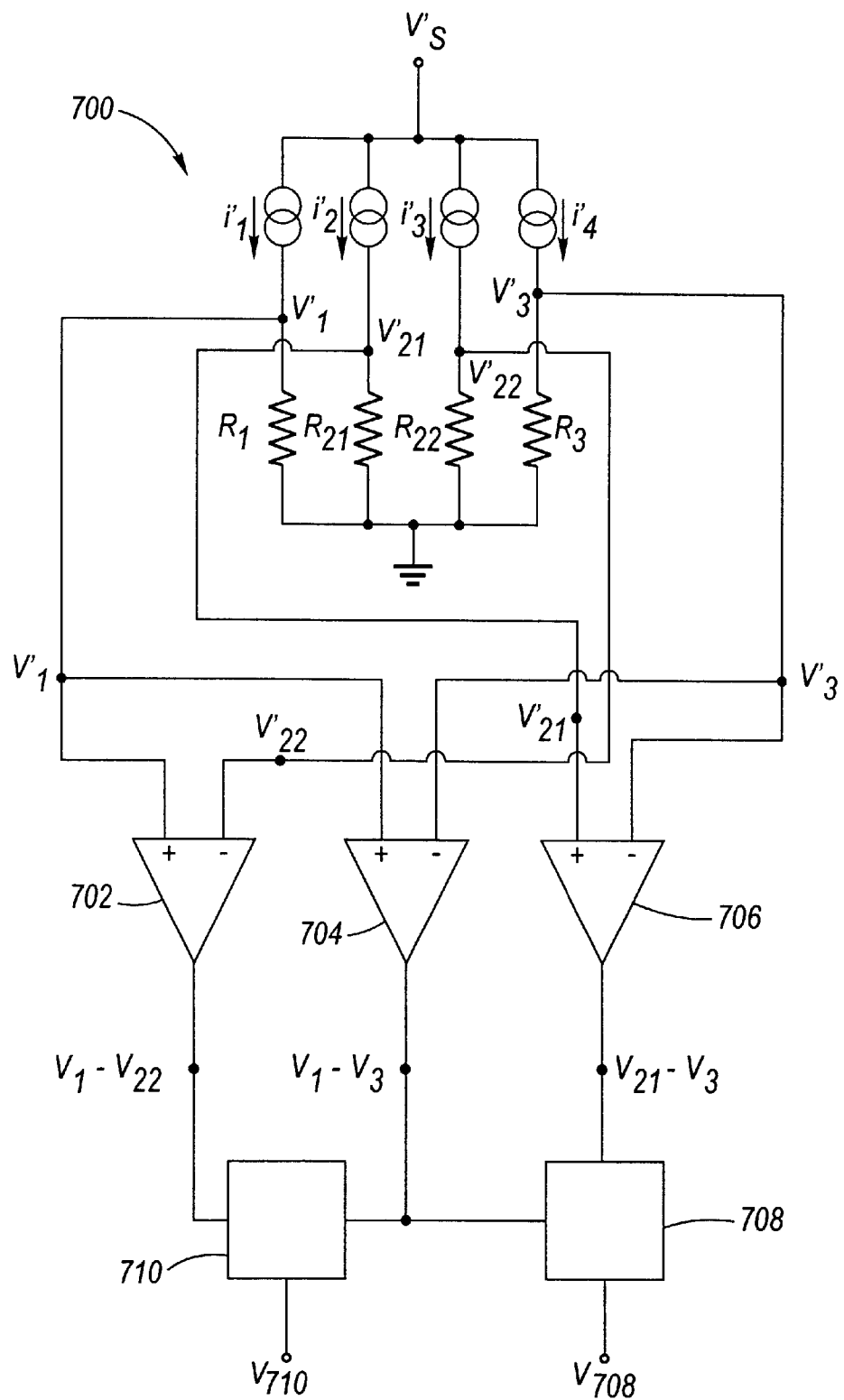
FIG. 7 shows a second example of an analog circuit implementing the first aspect of the present invention.

FIG. 7 shows a second example of an analog circuit 700 implementing the first aspect of the present invention. $V'_s$ is the power supply voltage and $i'_2$ and $i'_3$ are matched constant current sources such that $i'_2 = i'_3$. Constant current sources $i'_1$ and $i'_4$ are weighted such that $i'_1 = i'_2/p$ and $i'_4 = i'_2/q$. $V'_1$, $V'_{21}$, $V'_{22}$, and $V'_3$ are given by:

$$V'_1 = i'_2 * R_1/p \tag{19}$$

$$V'_{21} = i'_2 * R_{21} \tag{20}$$

$$V'_{22} = i'_3 * R_{22} \tag{21}$$

and $$V'_3 = i'_2 * R_3/q. \tag{22}$$

The output of differential amplifiers 702, 704, and 706 are, respectively, $(V_1 - V_{22})$, $(V_1 - V_3)$, and $(V_2 - V_3)$. Single quadrant analog divider 708 has a preset gain of A21 whereas single quadrant analog divider 710 has a preset gain of A22 whereby, $$V_{708} = A21(V_{21} - V_3)/(V_1 - V_3) = A21(R_{21} - R_3/q)/(R_1/p - R_3/q) = A \tag{23}$$

and $$V_{710} = A22(V_1 - V_{22})/(V_1 - V_3) = A22(R_1/p - R_{22})/(R_1/p - R_3/q) = A \tag{24}$$

thereby determining the angle of rotation A. Although not explicitly shown, it is understood that all components have appropriate power supply connections as needed and required, including ground.

Figure 8:
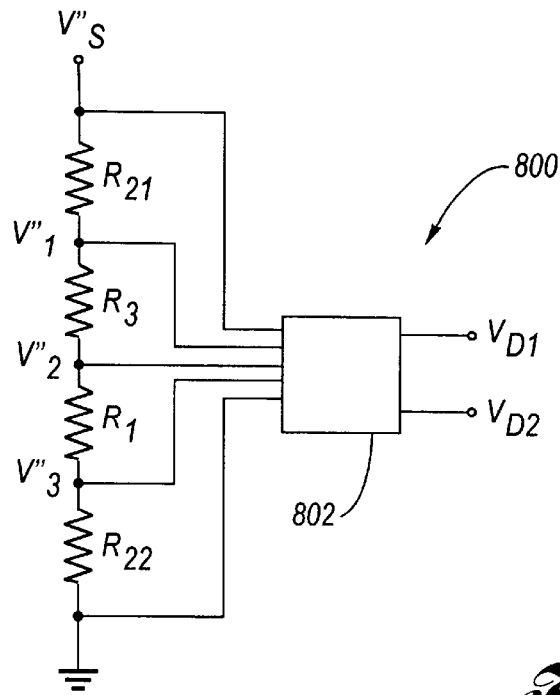
FIG. 8 shows an example of a circuit employing a digital processor implementing the first aspect of the present invention.

FIG. 8 shows an example of a circuit 800 employing a digital processor 802 (i.e. digital signal processor, microcontroller, microprocessor, etc.) implementing the first aspect of the present invention. $V''_s$ is the value of the supply voltage and is implicitly known to the digital processor 802, for example, as an input, or stored in the digital processor's memory. The parameters p, q, A21, A22, $R_{MAX}$, and $R_{MIN}$ are, preferably, stored in memory also. The values of $V''_1$, $V''_2$, and $V''_3$ are input to the digital processor 802 and can be expressed as:

$$V''_1 = V''_s * (R_3 + R_1 + R_{22})/(R_{21} + R_3 + R_1 + R_{22}) \tag{25}$$

$$V''_2 = V''_s * (R_1 + R_{22})/(R_{21} + R_3 + R_1 + R_{22}) \tag{26}$$

and $$V''_3 = V''_s * R_{22}/(R_{21} + R_3 + R_1 + R_{22}) \tag{27}$$

The value of the output voltages $V_{D1}$ and $V_{D2}$ are computed by the digital processor 802 and can be expressed as:

$$V_{D1} = A21 * \{[(V''_s - V''_1) - (V''_1 - V''_2)/q]/[(V''_2 - V''_3)/p - (V''_1 - V''_2)/q]\} \tag{29}$$

and $$V_{D2} = A22 * \{[(V''_2 - V''_3)/p - V''_3]/[(V''_2 - V''_3)/p - (V''_1 - V''_2)/q]\} \tag{30}$$

which, using equations 25, 26, and 27, reduce to:

$$V_{D1} = A21(R_{21} - R_3/q)/(R_1/p - R_3/q) = A \tag{31}$$

and $$V_{D2} = A22(R_1/p - R_{22})/(R_1/p - R_3/q) = A \tag{32}$$

thereby determining the angle of rotation A. The implementation of the above procedure for the digital processor 802 is well known in the art.

Figure 9:
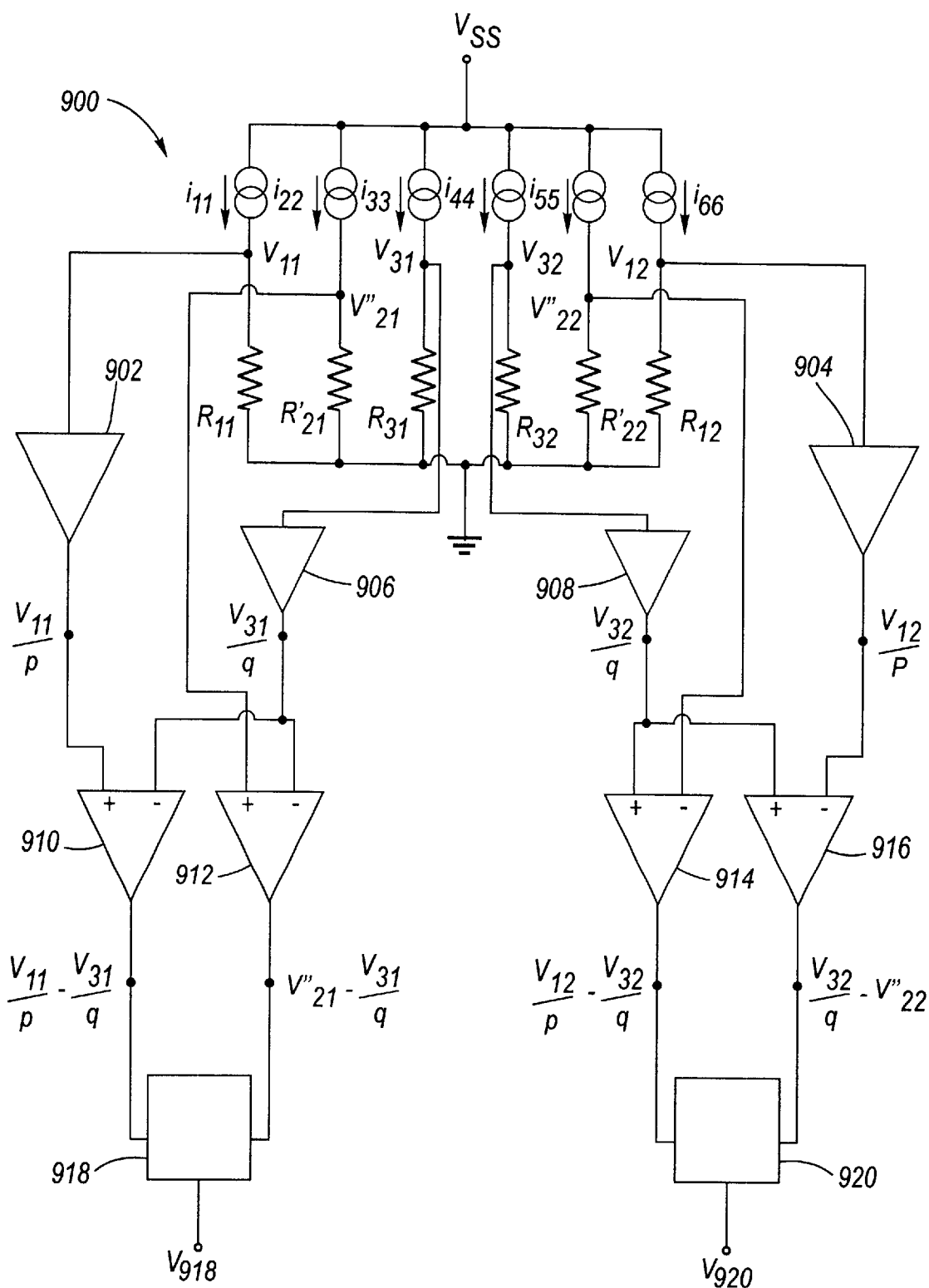
FIG. 9 shows a first example of an analog circuit implementing the second aspect of the present invention.

FIG. 9 shows a first example of an analog circuit 900 implementing the second aspect of the present invention. $V_{ss}$ is the power supply voltage and $i_{11}$, $i_{22}$, $i_{33}$, $i_{44}$, $i_{55}$, and $i_{66}$ are matched constant current sources such that $i_{11} = i_{22} = i_{33} = i_{44} = i_{55} = i_{66}$. $V_{11}$, $V_{12}$, $V''_{21}$, $V''_{22}$, $V_{31}$, and $V_{32}$ are given by:

$$V_{11} = i_{11} * R_{11} \tag{33}$$

$$V''_{21} = i_{22} * R'_{21} \tag{34}$$

$$V_{31} = i_{33} * R_{31} \tag{35}$$

$$V_{32} = i_{44} * R_{32} \tag{36}$$

$$V''_{22} = i_{55} * R'_{22} \tag{37}$$

and $$V_{12} = i_{66} * R_{12}. \tag{38}$$

Amplifiers 902 and 904 (i.e. OP-AMPs) have a preset gain of (1/p') whereas amplifiers 906 and 908 (i.e. OP-AMPs) have a preset gain of (1/q'). The output of differential amplifiers 910, 912, 914, and 916 are, respectively, $(V_{11}/p' - V_{31}/q')$, $(V''_{21} - V_{31}/q')$, $(V_{12}/p' - V_{32}/q')$, and $(V_{12}/p' - V''_{22})$. Single quadrant analog divider 918 has a preset gain of A21' whereas single quadrant analog divider 920 has a preset gain of A22', whereby, since the current sources are matched, $$V_{918}=A21'(V''_{21}-V_{31}/q')/(V_{11}/p'-V_{31}/q')=A21'(R'_{21}-R_{31}/q')/(R_{11}/p'-R_{31}/q')A' \quad (39)$$

and $$V_{920}=A22'(V_{12}/p'-V''_{22})/(V_{12}/p'-V_{32}/q')=A22'(R_{12}/p'-R'_{22})/(R_{12}/p'-R_{32}/q')=A \quad (40)$$

thereby determining the angle of rotation A'. Although not explicitly shown, it is understood that all components have appropriate power supply connections as needed and required, including ground.

Figure 10:
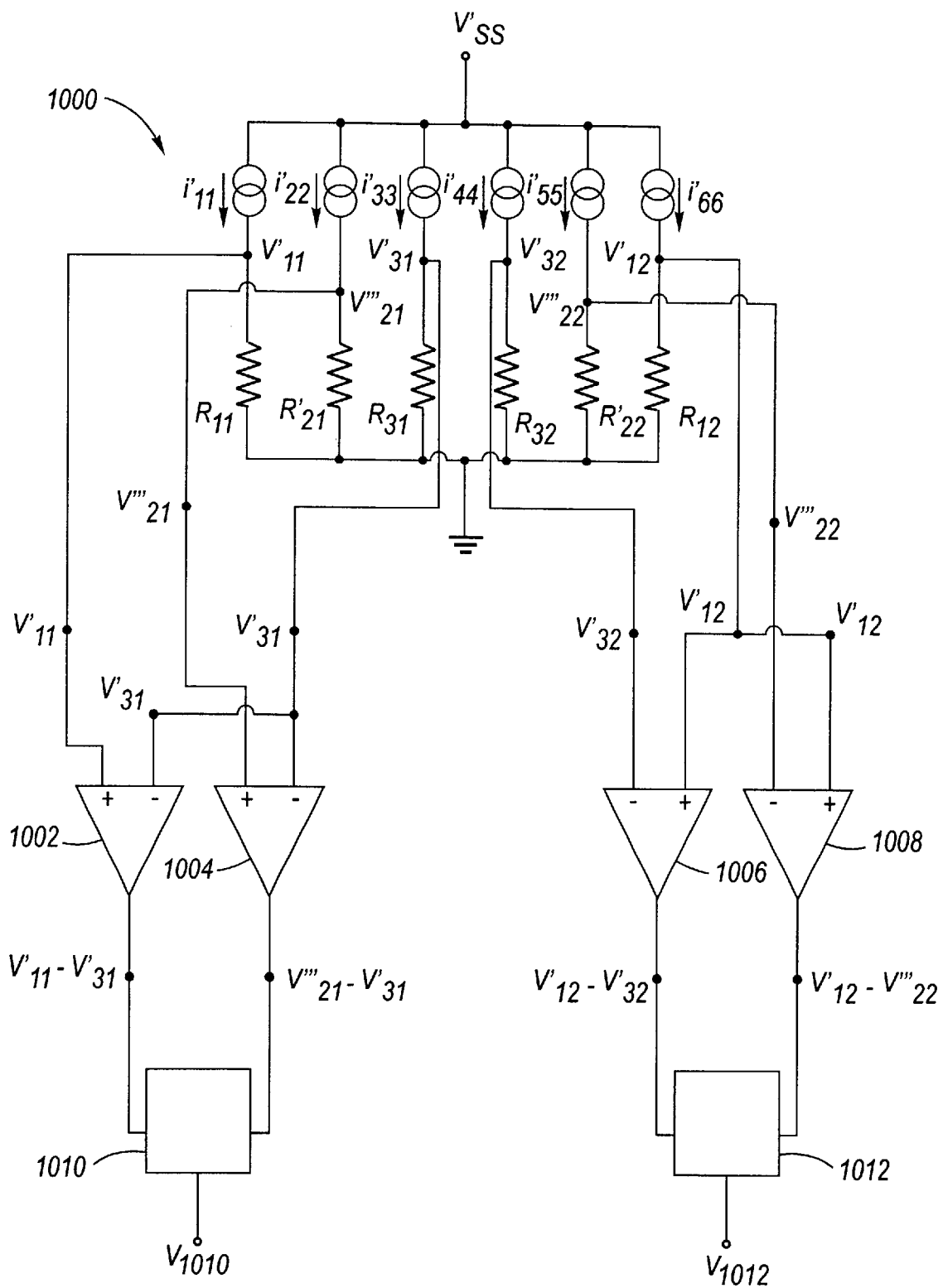
FIG. 10 shows a second example of an analog circuit implementing the second aspect of the present invention.

FIG. 10 shows a second example of an analog circuit 1000 implementing the second aspect of the present invention. $V'_{ss}$ is the power supply voltage and $i'_{22}$ and $i'_{55}$ are matched constant current sources such that $i'_{22}=i'_{55}$. Constant current sources $i'_{11}$, $i'_{33}$, $i'_{44}$, and $i'_{66}$ are weighted such that $i'_{11}=i'_{66}=i'_{22}/p'$ and $i'_{33}=i'_{44}=i'_{22}/q'$. $V'_{11}$, $V'_{12}$, $V'''_{21}$, $V'''_{22}$, $V'_{31}$, and $V'_{32}$ are given by:

$$V'_{11}=i'_{22}*R_{11}/p' \quad (41)$$

$$V'''_{21}=i'_{22}*R'_{21} \quad (42)$$

$$V'_{31}=i'_{22}*R_{31}/q' \quad (43)$$

$$V'_{32}=i'_{22}*R_{32}/q' \quad (44)$$

$$V'''_{2}=i'_{22}*R'_{22} \quad (45)$$

and $$V'_{12}=i'_{22}*R_{12}/p'. \quad (46)$$

The output of differential amplifiers 1002, 1004, 1006, and 1008 are, respectively, $(V'_{11}-V'_{31})$, $(V'''_{21}-V'_{31})$, $(V'_{12}-V'_{32})$, and $(V'_{12}-V'''_{22})$. Single quadrant analog divider 1010 has a preset gain of A21' whereas single quadrant analog divider 1012 has a preset gain of A22' whereby, $$V_{1010}=A21'(V'''_{21}-V'_{31})/(V'_{11}-V'_{31})=A21'(R'_{21}-R_{31}/q')/(R_{11}/p'-R_{31}/q')=A' \quad (47)$$

and $$V_{1012}=A22'(V'_{12}-V'''_{22})(V'_{12}-V'_{32})=A22'(R_{12}/p'-R'_{22})/(R_{12}/p'-R_{32}/q')=A' \quad (48)$$

thereby determining the angle of rotation A'. Although not explicitly shown, it is understood that all components have appropriate power supply connections as needed and required, including ground.

Figure 11:
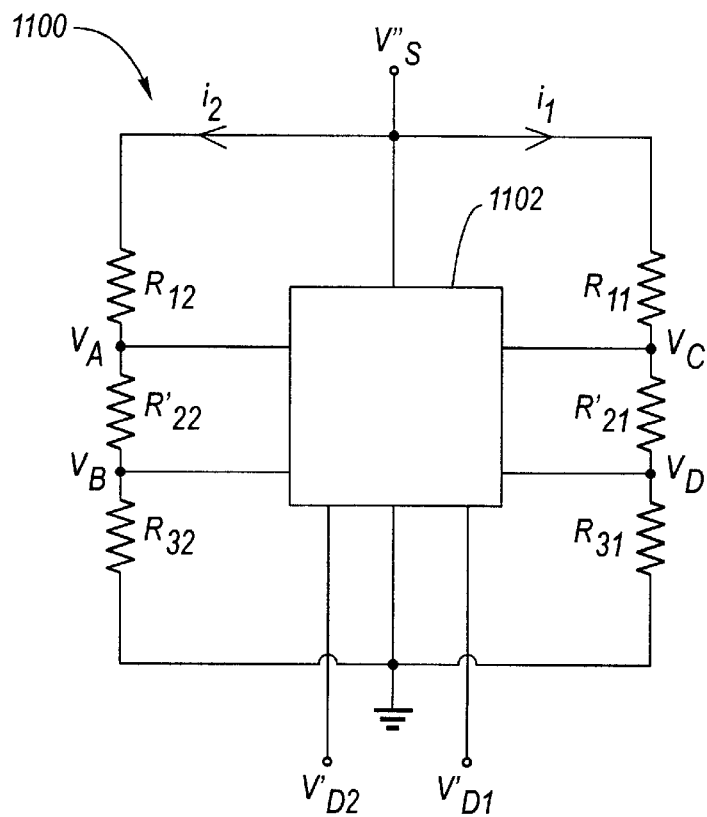
FIG. 11 shows an example of a circuit employing a digital processor implementing the second aspect of the present invention.

FIG. 11 shows an example of a circuit 1100 employing a digital processor 1102 (i.e. digital signal processor, microcontroller, microprocessor, etc.) implementing the second aspect of the present invention. $V''_{s}$ is the value of the supply voltage and is implicitly known to the digital processor 1102, for example, as an input or stored in the digital processor's memory. The parameters p', q', A21', A22', $R'_{MAX}$, and $R'_{MIN}$ are, preferably, stored in memory also. The values of $V_A$, $V_B$, $V_C$, and $V_D$ are input to the digital processor 1102 and can be expressed as:

$$V_A=V''_{ss}*(R'_{22}+R_{32})/(R_{12}+R'_{22}+R_{32}) \quad (49)$$

$$V_B=V''_{ss}*R_{32}/(R_{12}+R'_{22}+R_{32}) \quad (50)$$

$$V_C=V''_{ss}*(R'_{21}+R_{31})/(R_{11}+R'_{21}+R_{31}) \quad (51)$$

and $$V_D=V''_{ss}*R_{31}/(R_{11}+R'_{21}+R_{31}). \quad (52)$$

The value of the output voltages $V'_{D1}$ and $V'_{D2}$ are computed by the digital processor 1102 and can be expressed as:

$$V'_{D1}=A21'*\{[(V_C-V_D)-V_D/q']/[(V''_{ss}-V_C)/p'-V_D/q]\} \quad (53)$$

and $$V'_{D2}=A22'*\{[(V''_{ss}-V_A)/p'-V_B/q']/[(V''_{ss}-V_A)/p'-V_B/q]\} \quad (54)$$

which, using equations 49, 50, 51, and 52 reduce to:

$$V_{D1}=A21'(R'_{21}-R_{31}/q')/(R_{11}/p'-R_{31}/q')=A' \quad (55)$$

and $$V'_{D2}=A22'(R_{12}/p'-R'_{22})/(R_{12}/p'-R_{32}/q')=A' \quad (56)$$

thereby determining the angle of rotation A'. The implementation of the above procedure for the digital processor 1102 is well known in the art.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A magnetoresistor sensor comprising:

a single die comprising an array of magnetoresistor elements, said array comprising a first magnetoresistor element having a first area, a second magnetoresistor element having second area and a third magnetoresistor element having a third area, wherein each magnetoresistor element comprises a series of magnetoresistor segments arranged linearly in a respectively predetermined pattern which thereby defines the respective area thereof, wherein said second magnetoresistor element is located between and adjacent to said first and third magnetoresistor elements, and wherein said die has a center; and an article having an end superposably adjacent said die in concentric relation to said center and in perpendicular relation to said die, wherein a first magnetic irregularity and a second magnetic irregularity are mutually diametrically disposed at said end;

wherein said end is rotatable with respect to said die such that the first magnetic irregularity is always superposed said first magnetoresistor element, and wherein the second magnetic irregularity is always superposed said third magnetoresistor element; and wherein said first and third areas are much smaller than said second area.

2. The sensor of claim 1, wherein said array further comprises a fourth magnetoresistor element having a fourth area, said fourth magnetoresistor element being located between said third and first magnetoresistor elements, wherein said fourth magnetoresistor element comprises a series of the magnetoresistor segments arranged linearly in a respectively predetermined pattern which thereby defines the fourth area, and wherein said first and third areas are much smaller than said second and fourth areas.

3. The sensor of claim 2, further comprising an electronic circuit connected to said first, second, third and fourth magnetoresistor elements such that said first magnetoresistor element has a resistance R1 responsive to the magnetic field locally thereat, said second magnetoresistor element has a resistance R2 over a predetermined resistance range responsive to the magnetic field locally thereat, said third magnetoresistor element has a resistance R3 responsive to the magnetic field locally thereat, and said fourth magnetoresistor element has a resistance R4 over the predetermined resistance range responsive to the magnetic field locally thereat, wherein a rotative position of the end relative to the die is related to R2 and R4 redundantly as a function of R1 and R3 defining respective maximum and minimum resistances in a predetermined proportion of the resistance range.

4. The sensor of claim 3, further comprising a bias magnet located superposably adjacent said die so as to provide a magnetic field at said die, wherein said first magnetic irregularity comprises a ferromagnetic material and wherein said second magnetic irregularity comprises a substantially nonmagnetic material, wherein said first and second magnetic irregularities locally affect the magnetic field at the die.

5. The sensor of claim 3, wherein said first magnetic irregularity comprises a bias magnet and said second magnetic irregularity comprises a substantially nonmagnetic material.

6. The sensor of claim 1, further comprising an electronic circuit connected to said first, second and third magnetoresistor elements such that said first magnetoresistor element has a resistance R1 responsive to the magnetic field locally thereat, said second magnetoresistor element has a resistance R2 over a predetermined resistance range responsive to the magnetic field locally thereat, and said third magnetoresistor element has a resistance R3 responsive to the magnetic field locally thereat, wherein a rotative position of the end relative to the die is related to R2 as a function of R1 and R3 defining respective maximum and minimum resistances in a predetermined proportion of the resistance range of R2.

7. The sensor of claim 6, further comprising a bias magnet located superposably adjacent said die so as to provide a magnetic field at said die, wherein said first magnetic irregularity comprises a ferromagnetic material and wherein said second magnetic irregularity comprises a substantially nonmagnetic material, wherein said first and second magnetic irregularities locally affect the magnetic field at the die.

8. The sensor of claim 6, wherein said first magnetic irregularity comprises a bias magnet and said second magnetic irregularity comprises a substantially nonmagnetic material.

9. A magnetoresistor sensor comprising:
a single die comprising an array of magnetoresistor elements, said array comprising a first magnetoresistor element having a first area, a second magnetoresistor element having second area a third magnetoresistor element having a third area, a fourth magnetoresistor element having a fourth area, a fifth magnetoresistor element having a fifth area, and a sixth magnetoresistor element having a sixth area, wherein each magnetoresistor element comprises a series of magnetoresistor segments arranged linearly in a respectively predetermined pattern which thereby defmes the respective area thereof, wherein said first and second magnetoresistor elements are mutually adjacent and located between said sixth and third magnetoresistor elements such that said first magnetoresistor element is adjacent said sixth magnetoresistor element and said second magnetoresistor element is adjacent said third magnetoresistor element, wherein said fourth and fifth magnetoresistor elements are mutually adjacent and located between said sixth and third magnetoresistor elements such that said fourth magnetoresistor element is adjacent said third magnetoresistor element and said fifth magnetoresistor element is adjacent said sixth magnetoresistor element, and wherein said die has a center; and an article having an end superposably adjacent said die in concentric relation to said center and in perpendicular relation to said die, wherein a first magnetic irregularity and a second magnetic irregularity are mutually diametrically disposed at said end;
wherein said end is rotatable with respect to said die such that the first magnetic irregularity is always superposed said first and second magnetoresistor elements, and wherein the second magnetic irregularity is always superposed said fourth and fifth magnetoresistor elements; and
wherein said first, second, fourth and fifth areas are much smaller than said third and sixth areas.

10. The sensor of claim 9, further comprising an electronic circuit connected to said first, second, third, fourth, fifth and sixth magnetoresistor elements such that said first magnetoresistor element has a resistance R1 responsive to the magnetic field locally thereat, said second magnetoresistor element has a resistance R2 responsive to the magnetic field locally thereat, said third magnetoresistor element has a resistance R3 over a predetermined resistance range responsive to the magnetic field locally thereat, said fourth magnetoresistor element has a resistance R4 responsive to the magnetic field locally thereat, said fifth magnetoresistor element has a resistance R5 responsive to the magnetic field locally thereat, and said sixth magnetoresistor element has a resistance R6 over the predetermined resistance range responsive to the magnetic field locally thereat, wherein a rotative position of the end relative to the die is related redundantly to R3 and R6 as a function of R1 and R2 in mutual redundancy and R4 and R5 in mutual redundandcy defining respective maximum and minimum resistances in a predetermined proportion of the resistance range.

11. The sensor of claim 10, further comprising a bias magnet located superposably adjacent said die so as to provide a magnetic field at said die, wherein said first magnetic irregularity comprises a ferromagnetic material and wherein said second magnetic irregularity comprises a substantially nonmagnetic material, wherein said first and second magnetic irregularities locally affect the magnetic field at the die.

12. The sensor of claim 10, wherein said first magnetic irregularity comprises a bias magnet and said second magnetic irregularity comprises a substantially nonmagnetic material.

* * * * *